United States Patent
Loberg

(10) Patent No.: US 7,908,296 B2
(45) Date of Patent: Mar. 15, 2011

(54) INTEGRATING OBJECT-ORIENTED DESIGN SOFTWARE WITH RECORD-BASED CAD SOFTWARE

(75) Inventor: Barrie A. Loberg, Calgary (CA)

(73) Assignee: DIRTT Environmental Solutions, Ltd., Alberta (CA)

( * ) Notice: Subject to any disclaimer, the term of this patent is extended or adjusted under 35 U.S.C. 154(b) by 264 days.

(21) Appl. No.: 11/577,302

(22) PCT Filed: Feb. 16, 2007

(86) PCT No.: PCT/CA2007/000241
§ 371 (c)(1),
(2), (4) Date: Oct. 2, 2007

(87) PCT Pub. No.: WO2007/093060
PCT Pub. Date: Aug. 23, 2007

(65) Prior Publication Data
US 2009/0049081 A1 Feb. 19, 2009

Related U.S. Application Data

(60) Provisional application No. 60/774,096, filed on Feb. 16, 2006.

(51) Int. Cl.
*G06F 7/00* (2006.01)
*G06F 17/30* (2006.01)
(52) U.S. Cl. .......................... 707/796; 703/1
(58) Field of Classification Search .................. None
See application file for complete search history.

(56) References Cited

U.S. PATENT DOCUMENTS

| 5,111,392 | A | | 5/1992 | Malin |
| 5,255,207 | A | | 10/1993 | Cornwell |
| 5,293,479 | A | | 3/1994 | Quintero et al. |
| 5,572,639 | A | | 11/1996 | Gantt |
| 5,576,965 | A | | 11/1996 | Akasaka et al. |
| 5,894,310 | A | * | 4/1999 | Arsenault et al. ............. 345/679 |
| 5,977,982 | A | | 11/1999 | Lauzon |
| 6,014,503 | A | | 1/2000 | Nagata et al. |
| 6,037,945 | A | | 3/2000 | Loveland |
| 6,459,435 | B1 | | 10/2002 | Eichel |

(Continued)

FOREIGN PATENT DOCUMENTS

EP 1204046 5/2002

(Continued)

OTHER PUBLICATIONS

Chan, et al.:"Design of a Walkthrough System for Indoor Environments from Floor Plans"; Proceedings of the 1998 IEEE Conference on Information Visualization, Jul. 29-31, 1998, pp. 50-57.

(Continued)

*Primary Examiner* — Sathyanarayan Pannala
(74) *Attorney, Agent, or Firm* — Workman Nydegger

(57) ABSTRACT

Implementations of the present invention allow a user to work within a record-based design environment while achieving the advantages provided by an object-oriented database. In particular, the user of components in accordance with the present invention can create designs within a record-based application program, within an object-oriented application program, or within a third application program linked by the object-oriented program, and still have the graphical representation thereof visibly displayed in the record-based application program.

20 Claims, 4 Drawing Sheets

U.S. PATENT DOCUMENTS

| | | |
|---|---|---|
| 6,509,906 B1 | 1/2003 | Awe et al. |
| 6,662,144 B1 | 12/2003 | Normann et al. |
| 6,772,168 B2 | 8/2004 | Ardoin et al. |
| 6,888,542 B1 | 5/2005 | Clauss |
| 6,922,701 B1 | 7/2005 | Ananian et al. |
| 6,999,102 B2 * | 2/2006 | Felser et al. ............ 707/999.103 |
| 7,062,722 B1 | 6/2006 | Loberg |
| 7,249,005 B2 | 7/2007 | Loberg |
| 7,277,830 B2 | 10/2007 | Loberg |
| 2001/0047250 A1 | 11/2001 | Schuller |
| 2002/0093538 A1 | 7/2002 | Carlin |
| 2002/0144204 A1 | 10/2002 | Milner |
| 2004/0012542 A1 | 1/2004 | Bowsher |
| 2004/0117746 A1 | 6/2004 | Narain et al. |
| 2004/0145614 A1 | 7/2004 | Takagaki et al. |
| 2005/0071135 A1 * | 3/2005 | Vredenburgh et al. ............ 703/1 |
| 2005/0081161 A1 | 4/2005 | MacInnes |
| 2006/0041842 A1 | 2/2006 | Loberg |

FOREIGN PATENT DOCUMENTS

| | | |
|---|---|---|
| EP | 1098244 | 9/2005 |
| WO | WO9003618 | 4/1990 |
| WO | WO9322741 | 11/1993 |
| WO | WO2005033985 A1 | 4/2005 |
| WO | WO2006018744 | 2/2006 |
| WO | WO2007093060 | 8/2007 |

OTHER PUBLICATIONS

Josie Wernecke; Title: The Inventor Mentor: Programming Object Oriented 3D Graphics with Open Inventor; Release 2; Date: Jun. 19, 1997; Published on Web Site: www.cs.ualberta.cal-.

Edward J. DeJesus, James P. Callan, and Curtis R. Whitehead, Pearl: An Expert System for Power Supply Layout, 23rd Design Automation Conference, Paper 34.4, IEEE.

Office Action Mailed Oct. 18, 2006, U.S. Appl. No. 11/204,419.
Office Action Mailed Oct. 19, 2006, U.S. Appl. No. 11/204,420.
Office Action Mailed Nov. 28, 2007, U.S. Appl. No. 11/204,421.
Office Action Mailed Aug. 11, 2008, U.S. Appl. No. 11/204,421.
Office Action Mailed Dec. 23, 2008, U.S. Appl. No. 11/204,421.
Office Action Mailed Mar. 31, 2009, U.S. Appl. No. 11/204,421.
Office Action Mailed May 15, 2009, U.S. Appl. No. 11/204,421.
Office Action Mailed Jul. 29, 2009, U.S. Appl. No. 11/204,421.
International Search Report and Opinion on PCT/CA2007/000241, mailed May 15, 2007.
International Search Report and Opinion on PCT/CA2009/000190, mailed Jun. 5, 2009.
International Search Report and Opinion on PCT/CA2009/000183, mailed Jun. 9, 2009.
International Search Report and Opinion on PCT/CA2009/000311, mailed Jul. 30, 2009.

* cited by examiner

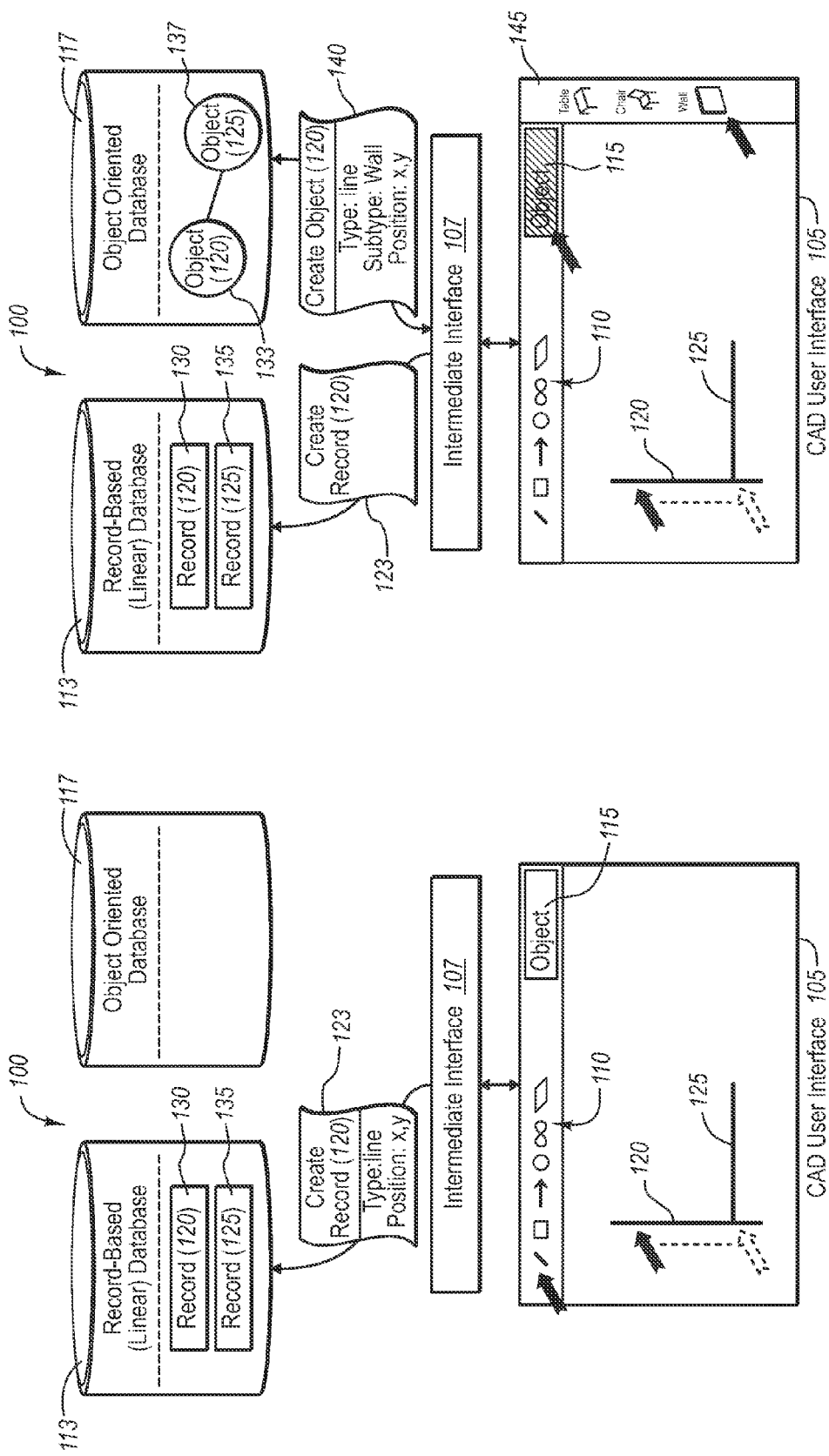

INTEGRATING OBJECT-ORIENTED DESIGN SOFTWARE WITH RECORD-BASED CAD SOFTWARE

CROSS-REFERENCE TO RELATED APPLICATIONS

The present invention is a U.S. National Stage Application corresponding to PCT Application No. PCT/CA2007/000241, filed on Feb. 16, 2007, entitled "Integrating Object-Oriented Design Software With Record-Based Cad Software," which claims the benefit of priority to U.S. Provisional Patent Application No. 60/774,096 filed on Feb. 16, 2006, entitled "Integrating object-oriented design software with record-based CAD software." The entire content of the above-mentioned patent applications is incorporated herein by reference.

BACKGROUND OF THE INVENTION

1. The Field of the Invention

This invention relates to systems, methods, and computer program products for modeling and design.

2. Background and Relevant Art

As computerized systems have increased in popularity, so has the range of applications that incorporate computational technology. Computational technology now extends across a broad range of applications, including a wide range of productivity and entertainment software. Indeed, computational technology and related software can now be found in a wide range of generic applications that are suited for many environments, as well as fairly industry-specific software.

Some examples of industry-specific application programs include those known as Computer-aided design (i.e., "CAD") programs, such as AUTOCAD. In general, CAD programs provide a user with the ability to draw lines on a CAD user interface, where those lines represent various "design entities" or elements in a plan view of a raw design space. To manage each of the various design entities created through the user interface, CAD programs typically incorporate a record-based database.

In general, the record-based database can also be referred to as a "linear" database, since it includes a set of sequential records whose relationships are based primarily on the sequence/moment in time at which those records were created. For example, when a user creates a line (i.e., a "design entity") in a CAD user interface, the data related to that line (such as type, position, etc.) are stored in a newly-created record in the record-based (linear) database. When a user creates the next line (or circle, etc.) in the CAD user interface, the corresponding linear (or sequential) database creates a new record in the linear database. Since the main relationship between these records is primarily based on sequence, each record includes little or no relation to other records within the database that were created much earlier or later in the sequence.

By contrast, there are also now design applications that incorporate non-sequential, three-dimensional ("3D") relationships for records, such as object-oriented software programs used for design functions. Generally, an object-oriented database represents each entity as an intelligent object block (analogous to a linear database's record). In contrast with the record in a record-based database, which is basically just a collection of data, each object block can be thought of as an independent program of computer-executable instructions in addition to certain user-entered data. The independent, intelligent nature of object blocks can enable a wide range of functionality not otherwise available to records.

For example, object blocks can identify multiple relationships with other object blocks, regardless of sequence entered. In particular, an object-oriented design program incorporates a hierarchical database rather than a linear one. In addition, object blocks can determine how they relate to other object blocks and to the complete solution represented by a particular design. For example, if a line is requested to be a specific length (or shape) by text entry or any other manner, but the current design cannot allow it, the object block for the line understands that it cannot comply with the request due to its relations within the complete solution. The object block can nevertheless remember this request, and apply it at such time that other factors change to a point where the original request could be allowed. As a result, the object blocks of an object-oriented design program are dynamic, and the knowledge that can be maintained within an object block is substantially greater than any conventional linear record.

A properly structured object-oriented database, such as a design software program (e.g., a JAVA-based program), can be configured to convert the linear data from the record-based database to an appropriate format in an object-oriented database. In cases such as these, record-based design entities (such as a simple AUTOCAD line) can be modified or converted to implement detailed, object-oriented blocks. Unfortunately, organizations are sometimes hesitant to change to a new relational, object-oriented model, such as described above for any number of reasons.

For example, an organization may be reticent to remove or supplant existing legacy systems or related platforms using a record-based, linear database program. On one level, this may be due to the inherent difficulties with retraining employees who are already fluent in the use of linear database applications. In addition, the organizations may desire to avoid difficulties that could occur updating business partners who may need documentation in a new format (based on linear records). One will appreciate, therefore, that these and other such factors can create an inertia effect toward an organization's migration to a more effective, object-oriented database format.

BRIEF SUMMARY OF THE INVENTION

Implementations of the present invention provide systems, methods, and computer program products configured to integrate linear and object-oriented design programs in a seamless fashion. In particular, implementations of the present invention allow a user to work within a linear design application environment and, at the same time, incorporate some or all of the advantages of an object-oriented database. In one implementation, for example, a user can link one or more design entities from a linear design application to one or more object blocks of an object-oriented database. When the user modifies the geometry of the linked design entity (e.g., trimming a design entity line), the corresponding object block can recognize the modification to the design entity, and cause redefining of the data model in both the object-oriented database and record-based (linear) database as appropriate.

For example, a method of providing object-oriented entity manipulations through a user interface of the CAD application program can involve providing one or more object status item(s) in a CAD user interface. In such a case, the selection of the object status item(s) results in a change in object state for one or more design entities. The method can also involve receiving one or more selections to create or manipulate one or more design entities in the CAD user interface. In addition, the method can involve identifying an object state for each of the one or more design entity selections. Furthermore, the method can involve manipulating one or more database entries in accordance with the identified object state for each of the one or more design entities.

In addition, a system configured to provide a record-based application program with functionality of an object-oriented design application program can include one or more record-based application programs having one or more CAD user interfaces for receiving user input and providing display of the user input. The system can also include a linear database configured to store one or more linear records corresponding to one or more design entities created through the one or more CAD user interfaces.

In addition, the system can include an object-oriented design application program having one or more interface components configured to interact with the one or more record-based application programs. Furthermore, the system can include an object-oriented database configured to store one or more object blocks corresponding to any of the one or more design entities. In this case, the one or more interface components are configured to correlate changes in the one or more linear records with the one or more object blocks. The one or more interface components are also configured to correlate changes in the one or more object blocks with the one or more linear records.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1A illustrates an implementation of the present invention in which a user creates or modifies one or more design entities through a CAD user interface that is linked to both a record-based database and an object-oriented database using a default setting;

FIG. 1B illustrates an implementation of the present invention in which a user creates or modifies one or more design entities through the CAD user interface of FIG. 1A after selecting one or more object status items;

DETAILED DESCRIPTION OF THE PREFERRED EMBODIMENTS

Figure 1C:
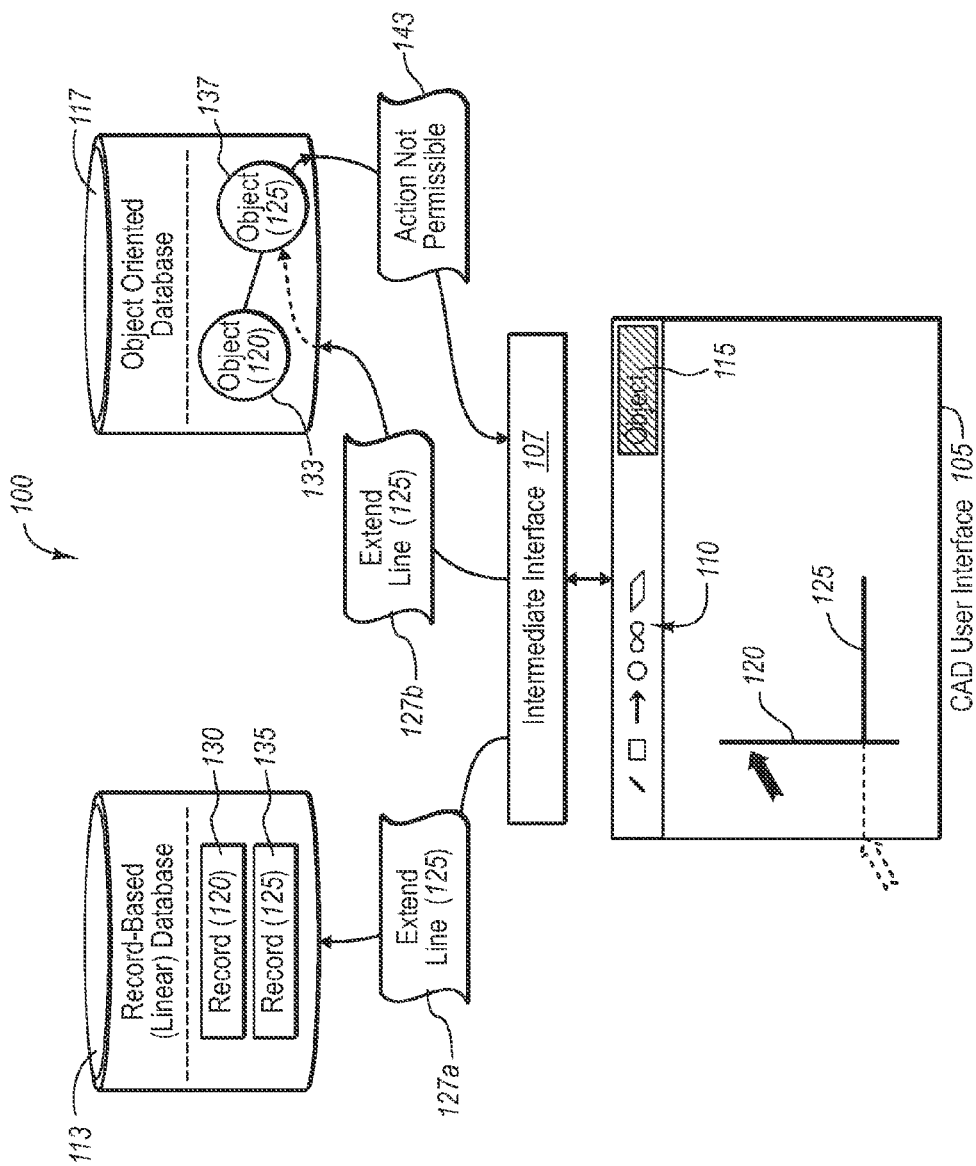
FIG. 1C illustrates an implementation of the present invention in which an object block of the object-oriented database of FIGS. 1A-1B corrects a user selection for an impractical modification of a design entity in the CAD user interface of FIGS. 1A-1B.

The present invention extends to systems, methods, and computer program products configured to integrate linear and object-oriented design programs in a seamless fashion. In particular, implementations of the present invention allow a user to work within a linear design application environment and, at the same time, incorporate some or all of the advantages of an object-oriented database. In one implementation, for example, a user can link one or more design entities from a linear design application to one or more object blocks of an object-oriented database. When the user modifies the geometry of the linked design entity (e.g., trimming a design entity line), the corresponding object block can recognize the modification to the design entity, and cause redefining of the data model in both the object-oriented database and record-based (linear) database as appropriate systems, methods, and computer program products configured to integrate linear and object-oriented design programs in a seamless fashion. In particular, implementations of the present invention allow a user to work within a linear design application environment and, at the same time, incorporate some or all of the advantages of an object-oriented database. In one implementation, for example, a user can link one or more design entities from a linear design application to one or more object blocks of an object-oriented database. When the user modifies the geometry of the linked design entity (e.g., trimming a design entity line), the corresponding object block can recognize the modification to the design entity, and cause redefining of the data model in both the object-oriented database and record-based (linear) database as appropriate.

As will be understood more fully herein, these and other advantages are realized at least in part since implementations of the present invention provide one or more mechanisms for translating or linking record-based data (e.g., linear or sequential database entries representing graphical entities in a CAD application) to detailed, object-oriented blocks. This translation/linking can be accomplished and mediated at least in part through the use of one or more intermediate interface 107 components configured to correlate record-based changes with object blocks in an object-oriented database. Linking to the object blocks, in turn, allows a CAD interface to take advantage of some of the more complex features of an object-oriented system, such as producing, viewing and modifying three-dimensional (3D) views of a design. In one implementation, the object-oriented design application program is implemented using a JAVA-based programming language.

The used of object blocks (e.g., JAVA-based object blocks) through a separate or intermediate interface 107 allows a user to work within a record-based CAD application, within an object-oriented application, or within a third application linked to the CAD application by the object-oriented application. The user can then implement the functions and output from any or all of the CAD-based or objected-oriented-based applications in an integrated, seamless fashion, such as modifying (e.g., trimming, extending, or mirroring, etc.) design entities without additional reactors, lisp type programs, or additional input and without having to replace the pre-existing CAD-based application program.

FIG. 1A illustrates an overview schematic diagram in which a CAD user interface is linked to both a record-based database and an object-oriented database via one or more intermediate interface 107 components using a default setting. In particular, FIG. 1A illustrates a basic CAD user interface 105 comprising a series of drawing tools 110. FIG. 1A also illustrates, however, in contrast with typical CAD-based application programs, one or more object status items 115 provided by an object-oriented design application program. Furthermore, FIG. 1A illustrates the use of one or more intermediate interface 107 components 107, which are part of the object-oriented design application program, that interface between the CAD user interface 105 and both a record-based database 113 and an object-oriented database 117.

As a preliminary matter, reference herein to "CAD" or "AUTOCAD" is meant to describe programs that incorporate general design functionality using linear or record-based databases, rather than a specific reference to any particular existing product. In addition, although any database entry might be thought of as a "record" on some level, the term "record-based" when referring herein to an application program or database will refer to application programs or databases that primarily use sequential or "linear" database entry/modification mechanisms, rather than object-oriented database entries. As previously mentioned, these types of database entries (i.e., records) are not only typically sequential, but also tend to include only basic information about a design entity, such as design entity type, design entity position, or the like. In contrast to object-oriented applications that use object blocks, therefore, a "record" can be understood herein as a passive data entry, while an "object block" can be understood herein as an active data entry with added intelligence.

In any event, FIG. 1A illustrates an implementation of the present invention in which a user creates one or more design entities without selecting one or more object status items 115. In this case, the object state for each design entity would be set to "off." In general, object status item 115 can comprise any of a selectable button, icon, or other form of selectable option that would be presented through a graphical user interface on a computer display. In one implementation, the object-oriented design application provides one or more plugins or modules, in addition to the object status item 115, which tag each design entity created or used in CAD user interface 115 with an object status field (not shown). The object status field for each design entity, therefore, presents the "object state," which indicates whether the user has selected the object status item 115 for that design entity.

In this example, FIG. 1A shows that a user selects use of a line, and draws line 120, potentially representing a wall in a design space. Since the user has not, in this example, selected item 115, intermediate interface 107 determines that the object state for design entities 120 and 125 are set to "off," (or other appropriate identifier in the object status field), and thus no desire from the user to link these design entities to an object block. As shown in FIG. 1A, therefore, intermediate interface 107 identifies the object state from any object status field associated with instructions regarding design entity 120 as set to "off." Intermediate interface 107 then simply passes instructions regarding the creation of design entity 120 as message 123 to record-based database 113; but sends no corresponding instructions to object-oriented database 117.

In contrast with FIG. 1A, however, FIG. 1B shows that the user has selected object status item 115 in the context of creating or modifying design entity 120. In one implementation, mere selection of object status item 115 can involve intermediate interface 107 copying all record data (e.g., 130, 135) corresponding to each design entity displayed in CAD user interface 105 (or all applicable records) and creating corresponding object blocks (e.g., 133, 137) in database 117. In the illustrated example, however, this selection simply causes a change in object state at least with respect to design entity 120 to "on," so that design entity 120 is correlated with an object block. For example, FIG. 1B shows that the user's drawing of design entity 120 causes intermediate interface 107 to send a "create object" message 140 to object-oriented database 117, in addition to passing message 123 (also shown in FIG. 1A) indicating a request to create a new record 130.

In general, one will appreciate that there are a number of different ways that a user can correlate design entity 120 between record-based database 113 and object-oriented database 117. For example, a user could select object status item 115 before drawing any design entities, and set that as a default for all design entities until deselecting the object status item 115. Since each following design entity would have the same object state of "on," the intermediate interface 107 would create or modify both a record and an object block corresponding to the design entity during creation, modification, or other form of update.

In other cases, however, the user could select on particular design entities to have a particular object state of "on" or "off." In particular, the user could select object status item 115 during or after drawing line design entity 120, and/or make an additional selection (not shown) indicating that design entity 120 should have an object state of "on." In such a case, intermediate interface 107 could recognize creation or modification of design entity involves modifications to an object block in database 117 as well as a record in database 113, while creation or modification of design entity 125 involves modifications only to a record in database 113. In still further cases, one or more selection items (not shown) can be provided for the user to select conversion of all design entity records (or all records, design entity or not) from database 113 to database 117. This would involve any one or more of copying, transferring, or moving data from database 113 to database 117 to ensure proper correlation, or total substitution of record-based database 113 with object-oriented database 117.

In addition to the foregoing, FIG. 1B also shows that selection of object status item 115 can result in the presentation of additional user interfaces or design choices to a user. For example, FIG. 1B shows that upon identifying that the user has selected object status item 115, intermediate interface 107 presents design interface options 145 as an inclusion in CAD user interface 105, or as a separate standalone interface. In either case, the user can add refinements or other details to a design entity in CAD user interface 105. For example, FIG. 1B shows that the user has selected a "wall" option, in addition to the object status item 115. Thus, when the user draws design entity 120, the intermediate interface 107 recognizes the object state for the design entity, as well as the corresponding details entered through interface 145.

The intermediate interface 107 then sends message 140 to object-oriented database 117 not only to create an object (133) for design entity 120, but also to include the additional details requested, such as that the design entity represents a wall, or even other details about the wall structure, color, design, texture, materials, etc. Ordinarily, however, these and other details might not be included in the typical record for a design entity in a CAD application. For example, FIG. 1A shows that intermediate interface 107 simply sends the same message 123 as shown in FIG. 1A that the type of design entity is a "line," as well as the position information. In any event, one will appreciate that design entities that are correlated with object blocks can be opened and modified in any user interface (whether the CAD user interface 105, or another user interface provided by the object-oriented design application program). By contrast, design entities that are not correlated with object blocks (i.e., object status set to "off") will generally be opened or modified only in the CAD application program.

FIG. 1C illustrates an implementation of the present invention in which an object block of the object-oriented database of FIGS. 1A-1B attempts to resolve a potentially impractical user selection. In particular, FIG. 1C illustrates at least one of the advantages provided to the record-based CAD application by implementing the functionality of an object-oriented design application/database. For example, FIG. 1C shows that the user extends the design entity 125, in this case a wall, through design entity 120, which in this case is also an outer wall.

In a typical CAD based application, the user might be free to draft this extension to design entity 125 because the records 130, 135 of database 113 do not resolve the conflict, and only implement or record the user's drawing selection. By contrast, FIG. 1C shows that the objects 133, 137 of object-oriented database 117 can utilize intelligence to resolve the conflict. For example, FIG. 1C shows that, upon receiving the user's selection, intermediate interface 107 sends message 127a to record-based database 113, of the user's selection for line 125. In addition, intermediate interface 107 sends message 127b to object-oriented database 117, which also includes essentially the same information, as applicable, regarding the user's selection for line 125. In contrast with records 120 and 125, however, FIG. 1C shows that object 137 determines based on its own data (as well as, potentially, on a comparison with the data of object 133) that this request is either impractical or impermissible.

Accordingly, FIG. 1C shows that object 137 sends a response message 143 to intermediate interface 107 indicating that this request is not permissible. Intermediate interface 107 can then perform any number of corresponding response actions. In one implementation, for example, intermediate interface 107 passes one or more messages (not shown) to CAD user interface 105, which causes the new but impermissible user selection (shown in dashes) to be removed or corrected. For any such removal or correction, intermediate interface 107 can also pass one or more additional messages (not shown) to record-based database 113 to update record 135 in the same manner. In other or alternative implementations, intermediate interface 107 can send one or more messages to prompt the user for additional action based on a warning signal, and/or pass a corresponding signal to record 135 in database 113.

One will appreciate that this corrective ability can be applied to a wide number of design entities drawn or made by a user in CAD user interface 105. For example, the object blocks of database 117 could correct a situation where the user drew the components of a chair and placed those components inadvertently on top of a wall. In such a case, the object blocks might cause the CAD user interface 105 to automatically move the chair to a more appropriate position, if not deleting the user's placement altogether.

Figure 1D:
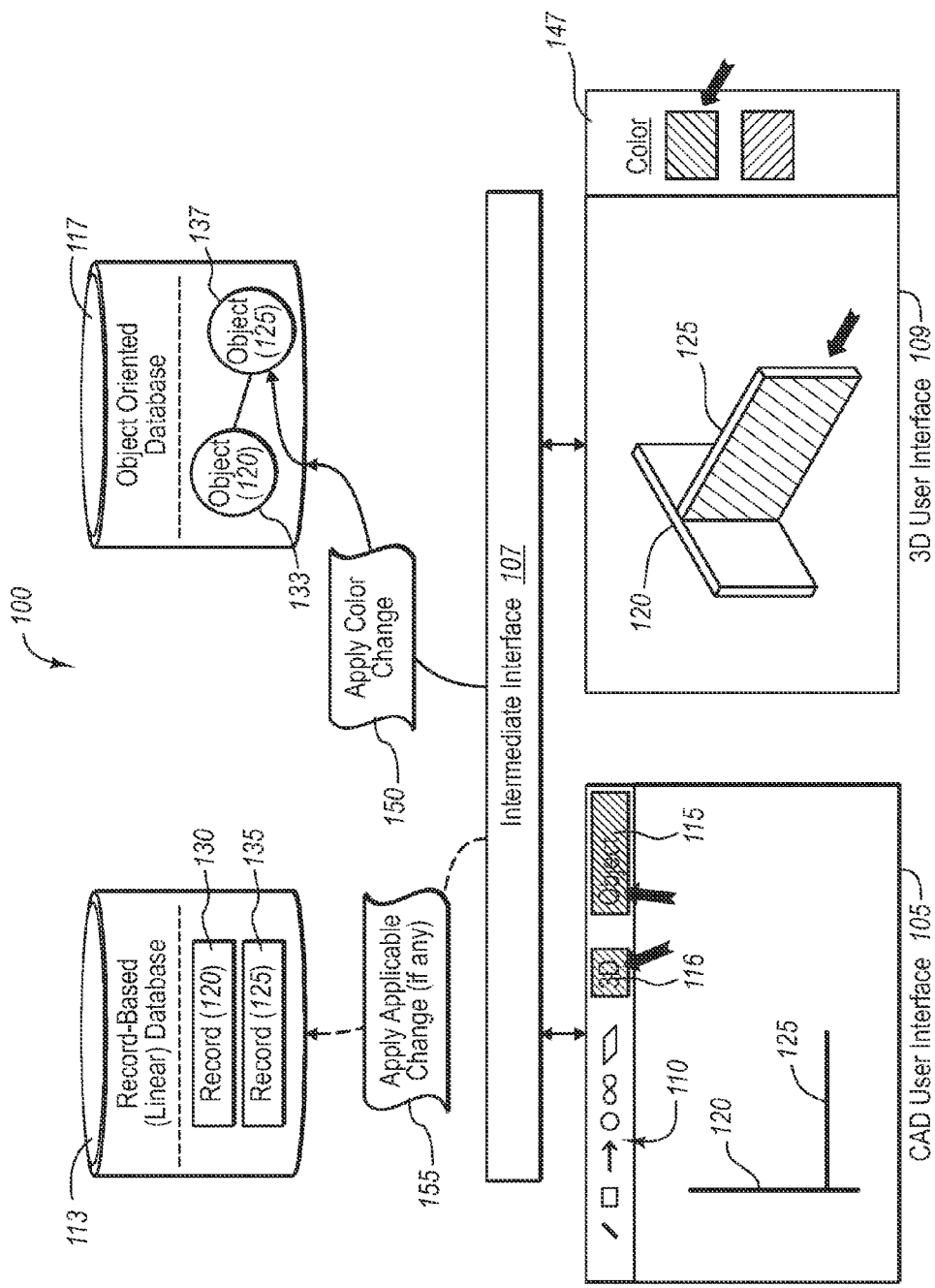
FIG. 1D illustrates an implementation of the present invention in which a user opens a three-dimensional interface and makes corresponding changes to one or more design entities of the CAD user interface in the three-dimensional interface.

In addition to the foregoing, the object blocks of database 117 can be used to correct or implement user selections made in views other than the CAD user interface 105. For example, FIG. 1D shows that the user has selected a "3D" option 116. In general, 3D option 116 can be any of a button, icon, or menu pull-down option, or the like provided by the object-oriented design application (or plugin/component thereof) through the CAD user interface 105. FIG. 1D shows that, upon such selection, 3-D interface 109 is opened, showing lines 120 and 125 as walls in three-dimensional format.

In general, the three-dimensional format of interface 109 is generated at least partly from the more detailed information contained in the object blocks (e.g., 133, 137) of database 117. For example, the object blocks of database 117 can contain information not only of size or position, but also of texture, color, width or gauge, number or types of mounting components, as well as three-dimensional representations of the types of materials used in the wall (e.g., glass, wood, dry wall, etc.), the lighting at a particular angle, etc. The object blocks can also include information about pricing for various components, or other forms of information deemed applicable for each design entity. As such, the user can then navigate around or through any of these design entities, in various angles and degrees of proximity, and even select pricing or other details instantly with respect to a particular design entity. The user can also make any selections or changes to the three-dimensional views (or two-dimensional views, as appropriate) of each design entity, and have those reflected seamless in all entries for each corresponding record or object, regardless of database (113 and/or 117).

In this case, for example, FIG. 1D shows that the user's selection of 3-D item 116 results not only in the opening of 3-D interface 109, as well as the opening of a color palette interface 147. In this example, FIG. 1D further shows that the user selects one of the colors from color palette interface 147, which the intermediate component 107 then applies to design entity 127. Intermediate component 107 then sends message 150 to database 117, which updates object 137 for this color selection (if available). Similarly, and if applicable, intermediate component 107 can then send a message 155 to record-based database 113 to update record 135 for design entity 125. In the event color is not used in the CAD user interface 105, intermediate component 107 may be able to even omit sending message 155 at all.

Figure 2:
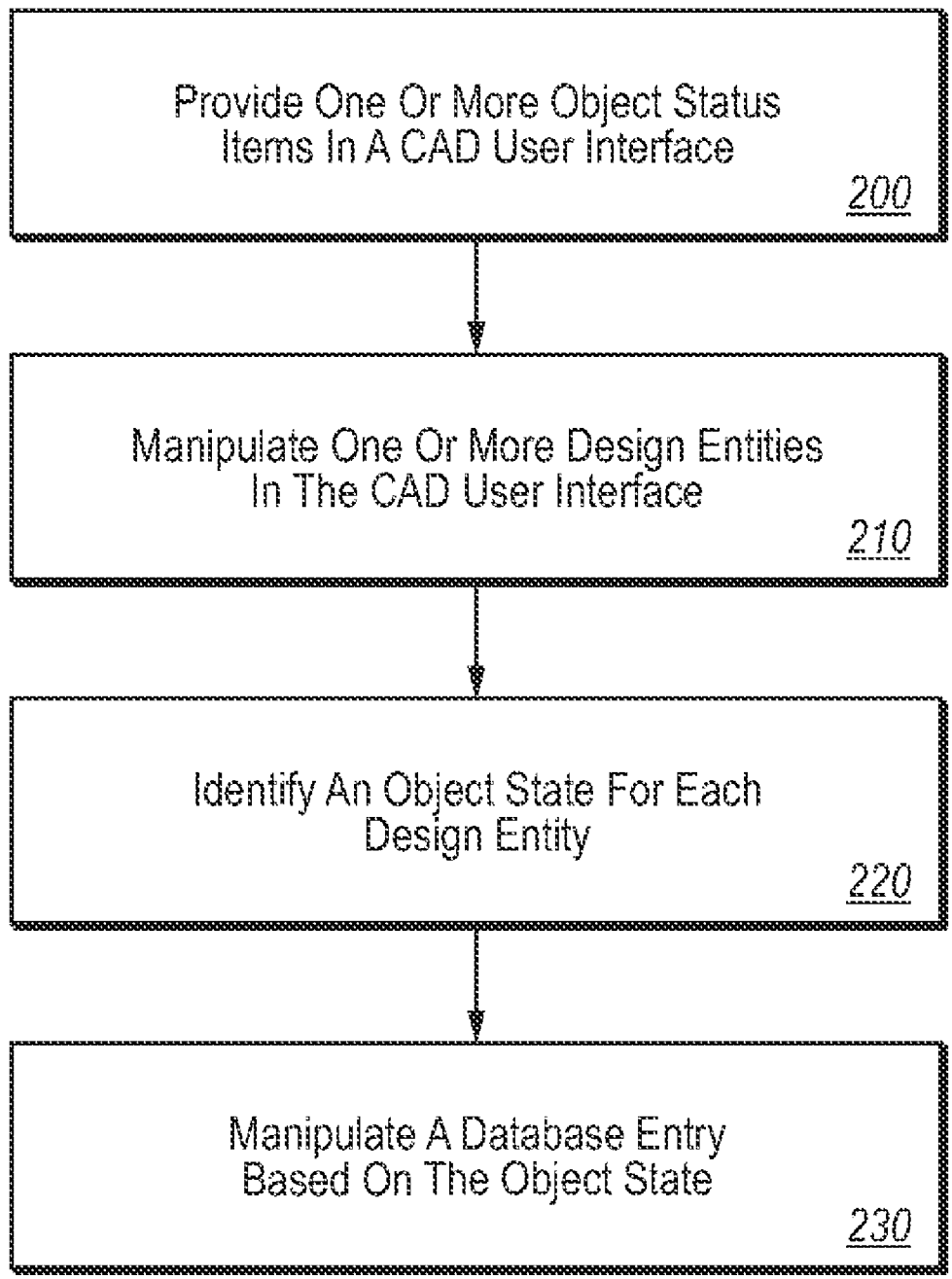
FIG. 2 illustrates a flowchart of a series of acts in a method of integrating an object-oriented database with a record-based, or linear, database in accordance with an implementation of the present invention.

Accordingly, FIGS. 1A-1D illustrate a number of different components and schematics for seamlessly integrating the functionality of an object-oriented design application with a record-based design application. In addition to the foregoing, implementations of the present invention can also be described in terms of flowcharts of acts in a method of accomplishing a particular result. For example, FIG. 2 illustrates a sequence of acts in a method of providing object-oriented entity manipulations through a user interface of the CAD application program. The acts of FIG. 2 are described below with respect to the schematics and components of FIGS. 1A-1D.

For example, FIG. 2 shows that a method in accordance with an implementation of the present invention can comprise an act 200 of providing one or more object status items in a CAD user interface. Act 200 includes providing one or more object status items in a CAD user interface, wherein selection thereof results in a change in object state for one or more design entities. For example, FIG. 1A illustrates object status item 115, which, if not selected by the user, defaults to an object status of "off." In such a case, the selected design entities are created only in conjunction with the creation of records in record-based database 113.

FIG. 2 also shows that the method can comprise an act 210 of manipulating one or more design entities in the CAD user interface. Act 210 includes receiving one or more selections to create or manipulate one or more design entities in the CAD user interface. For example, FIGS. 1A-1C show that the user draws or modifies one or more design entities, such as design entity 120 in CAD user interface 105. Similarly, FIG. 1D shows that the user can open a three-dimensional view from the CAD user interface 105, and modify the design objects originally created in the three-dimensional view through 3-D user interface 109.

In addition, FIG. 2 shows that the method can comprise an act 220 of identifying an object state for each design entity. Act 220 includes identifying an object state for each of the one or more design entity selections. For example, FIG. 1A shows that object status item 115 has not been selected, and as such, intermediate interface 107 would identify the corresponding object state for any corresponding user selection or design choice to be set to "off" or some other default identifier. By contrast, such as with FIGS. 1B-1D, the object status item 115 is selected. In those examples, therefore, the intermediate interface 107 will identify the object state user selections or modifications of a design entity made while this item is selected to be set to "on."

Furthermore, FIG. 2 shows that the method can comprise an act 230 of manipulating a database entry based on the object state. Act 230 includes manipulating one or more database entries in accordance with the identified object state for each of the one or more design entities. For example, FIG. 1A shows that, since the object state for design entity 120 is set to the default or "off" value, intermediate interface 107 scans the object state for the given user design entity selections, and identifies that the design entity is not to be associated with an object block As such, intermediate interface 107 simply passes on any instructions from the interface to record-based database 113.

By contrast, such as in FIGS. 1A-1D, where the object state for a user selection is set to "on," or some other value indicative of using the object-oriented design application, intermediate interface 107 scans the object state for each design entity selection and identifies that there is to be an associated with an object block. As such, intermediate object manipulates object blocks (e.g., 133, 137) in addition to passing manipulation instructions to database 113. One will appreciate, therefore, that in at least one implementation, an important feature includes the intermediate interface 107 scanning all user selection instructions from CAD user interface 105 for object state (e.g., via an object status field) prior to manipulating either or both of the record-based or object-based databases 113, 117.

Accordingly, FIGS. 1A-2 provide a number of different components, schematics, and mechanisms for implementing the functionality of an object-oriented design application program through a traditional record-based design application program, such as a CAD-based application program. In particular, implementations of the present invention provide object-oriented design software that allows conversion of record-based data to object-oriented data in representation of graphical entities in a record-based CAD application. Implementations of the present invention also provide object-oriented design software that allows conversion of simple record-based entities of CAD software to detailed object-oriented blocks. In addition, implementations of the present invention provide object-oriented design software that allows the user to work in a record-based CAD application, utilizing the commands, functions and output of the CAD application, while benefiting from the advantages of the object-oriented database of the object-oriented design software.

Furthermore, implementations of the present invention provide object-oriented design software that allows the user to work within a record-based CAD application, within the CAD design software interface, or within a third application linked to the CAD application by the design software application, allowing the use of functions and output from all or any of the applications. Still further, implementations of the present invention provide object-oriented design software whereby record-based entities of a CAD application can be used to modify (such as trimming, extending or mirroring etc.) object-oriented entities without additional reactors, lisp type programs or additional input.

The embodiments of the present invention may comprise a special purpose or general-purpose computer including various computer hardware, as discussed in greater detail below. In particular, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A method of providing object-oriented entity manipulations through a user interface of a Computer-Aided Design ("CAD") application program that utilizes a record-based linear database, comprising the acts of:
   recognizing one or more selections to create or manipulate a design entity in the CAD user interface;
   identifying a data model of the design entity stored in the record-based linear database;
   creating a second, object-based data model of the design entity;
   storing the object-based data model within an object oriented database; and
   linking the data model of the design entity stored in the record-based linear database to the object-based data model of the design entity stored in the object oriented database.

2. The method as recited in claim 1, further comprising an act of providing one or more object status items in a CAD user interface, wherein selection thereof results in a change in object state for one or more design entities.

3. The method as recited in claim 2, further comprising an act of relating one or more linear records of the one or more design entities to one or more object blocks in an object-oriented database for the one or more design entities.

4. The method as recited in claim 1, wherein the act of creating an object-based data model of the design entity comprises an act of copying data of one or more linear records corresponding to the a data model of the design entity stored in the record-based linear database to one or more object blocks in the object-oriented database.

5. The method as recited in claim 2, further comprising an act of creating one or more object blocks in the object-oriented database upon detecting a change in the object state for the one or more design entities.

6. The method as recited in claim 1, further comprising an act of receiving one or more selections to change the design entity.

7. The method as recited in claim 6, further comprising the acts of:
   in response to the one or more selections, manipulating one or more linear records corresponding to the data model of the design entity stored in the record-based linear database; and
   subsequently sending one or more requests from the record-based database to the object-oriented database to update one or more object blocks of the object-based data model of the design entity.

8. The method as recited in claim 7, further comprising an act of any of the one or more object blocks of the object-based data model of the design entity determining that at least one request of the one or more requests is physically impractical in a real-world environment.

9. The method as recited in claim 8, further comprising an act of the any of the one or more object blocks of the object-based data model of the design entity sending one or more responses to the record-based database to modify or deny the at least one request.

10. The method as recited in claim 9, wherein the one or more responses include an instruction to change a linear record to reflect a physically-practical solution for a real-world environment.

11. The method as recited in claim 6, further comprising the acts of:
   in response to the one or more selections, manipulating one or more object blocks of the object-based data model of the design entity; and
   subsequently sending one or more requests from the object-oriented database to the record-based database to update one or more linear records corresponding to the data model of the design entity stored in the record-based linear database.

12. The method as recited in claim 6, further comprising an act of receiving one or more requests through the CAD user interface to open a three-dimensional view of the design entity.

13. The method as recited in claim 12, wherein the one or more selections are made to the design entity via the requested three-dimensional view.

14. The method as recited in claim 12, further comprising an act of the CAD user interface passing the one or more requests for the three-dimensional view to the object-oriented design application program.

15. The method as recited in claim 14, wherein the object-oriented design application program performs the acts of:
   opening the requested three-dimensional view of the design entity; and
   manipulating one or more object blocks of the object-based data model of the design entity in accordance with the one or more selections.

16. A system configured to provide a record-based application program with functionality of an object-oriented design application program through a record-based application program interface, comprising:
   one or more record-based application programs having one or more Computer-Aided Design ("CAD") user interfaces for receiving user input and providing display of the user input;
   a linear database configured to store one or more linear data model records corresponding to one or more design entities created through the one or more CAD user interfaces;
   an object-oriented design application program having one or more intermediate interface components configured to interact with the one or more record-based application programs; and
   an object-oriented database configured to store one or more object-based data models corresponding to any of the one or more design entities;
   wherein the one or more intermediate interface components are configured to correlate changes in one or more linear data model records corresponding to a design entity with one or more object-based data models of the design entity, and to correlate changes in the one or more object-based data models of the design entity with the one or more linear data model records corresponding to the design entity.

17. The system as recited in claim 16, wherein the one or more CAD user interfaces comprise one or more selectable object status items that, when selected, cause activation of the object-oriented design application program.

18. The system as recited in claim 17, further comprising one or more additional user interfaces provided by the object-oriented design application program in response to a selection of one of the one or more selectable object status items through the one or more CAD user interfaces.

19. The method as recited in claim 18, wherein the one or more additional user interfaces provide one or more dialog boxes configured to, upon request by a user, display a three-dimensional view, or modify a three-dimensional version of a design entity that was originally displayed in the one or more CAD user interfaces.

20. A computer-program storage product comprising computer-executable instructions stored thereon that, when executed, cause one or more processors at a computerized design environment comprising a Computer-Aided Design ("CAD") application program to perform a method comprising:
   recognizing one or more selections to create or manipulate a design entity in a CAD user interface that utilizes a record-based linear database;
   identifying a data model of the design entity stored in the record-based linear database;
   creating a second, object-based data model of the design entity;
   storing the object-based data model within an object oriented database; and
   linking the data model of the design entity stored in the record-based linear database to the object-based data model of the design entity stored in the object oriented database.

* * * * *

UNITED STATES PATENT AND TRADEMARK OFFICE
CERTIFICATE OF CORRECTION

| | | |
|---|---|---|
| PATENT NO. | : 7,908,296 B2 | Page 1 of 1 |
| APPLICATION NO. | : 11/577302 | |
| DATED | : March 15, 2011 | |
| INVENTOR(S) | : Loberg | |

It is certified that error appears in the above-identified patent and that said Letters Patent is hereby corrected as shown below:

Title Page, Item
(22) PCT Filed: change "Feb. 16, 2007" to --Apr. 17, 2007--

Column 5
Line 13, change "107, which" to --which--

Column 8
Line 31, change "127" to --120--
Line 38, delete "at all"

Column 9
Line 18, change ""on."" to --"on".--

Signed and Sealed this
Twenty-sixth Day of July, 2011

David J. Kappos
*Director of the United States Patent and Trademark Office*